United States Patent [19]

Hanlin

[11] Patent Number: 5,596,471

[45] Date of Patent: Jan. 21, 1997

[54] ADJUSTABLE UNDERVOLTAGE TRIP FAULT INTERRUPT CIRCUIT

[75] Inventor: Charles E. Hanlin, Fremont, Calif.

[73] Assignee: Advanced Micro Devices, Inc., Sunnyvale, Calif.

[21] Appl. No.: 435,299

[22] Filed: May 5, 1995

[51] Int. Cl.$^6$ .............................. H02H 3/24; H02H 7/09
[52] U.S. Cl. .................. 361/92; 361/33; 361/56
[58] Field of Search .................. 361/92, 88, 89, 361/86, 85, 83, 79, 78, 77, 56, 18, 20, 61, 23, 28, 29, 33; 324/521, 522; 340/657, 648, 660, 661, 663

[56] References Cited

U.S. PATENT DOCUMENTS

| | | | |
|---|---|---|---|
| 3,784,846 | 1/1974 | Krick et al. | 361/92 |
| 3,940,663 | 2/1976 | Meier et al. | 361/92 |
| 4,031,463 | 6/1977 | Norberg | 361/86 |

*Primary Examiner*—Jeffrey A. Gaffin
*Assistant Examiner*—Ronald W. Leja
*Attorney, Agent, or Firm*—Davis Chin

[57] ABSTRACT

An adjustable undervoltage trip fault interrupt circuit is used to prevent "nuisance" undervoltage fault trips caused by instantaneous sags in the AC power lines of less than a selectable time. The interrupt circuit includes a time delay circuit (IC4) responsive to a detected signal for generating a pulse signal having a selectable duration. A gating circuit (IC3) is responsive to the detected signal and the pulse signal for generating a fault trip signal only when the detected signal is longer than the selected duration of the pulse signal. In this manner, instantaneous line sags shorter than the selected duration of the pulse signal are eliminated from causing the "nuisance" interruption of a variable frequency drive controller.

5 Claims, 3 Drawing Sheets

5,596,471

ADJUSTABLE UNDERVOLTAGE TRIP FAULT INTERRUPT CIRCUIT

BACKGROUND OF THE INVENTION

This invention relates generally to electronic control circuitry and more particularly, it relates to an adjustable undervoltage trip fault interrupt circuit for preventing "nuisance" undervoltage fault trips caused by instantaneous sags in the AC power lines of less than a selectable time.

As is generally known, AC adjustable frequency drive controllers are typically provided for controlling the flow from centrifugal fans or pumps used in HVAC systems located in various industrial plants. The drive controller is used directly to accomplish this function by controlling the speed of an AC motor. Such an adjustable frequency drive controller is commercially available from the Graham Company of Milwaukee, Wis., under their Model Nos. 1576AFC15-300.

An undervoltage detection or sensing circuit is generally provided for the drive controller for rendering undervoltage protection. Upon the decrease or drop in the incoming line voltage below a set point, a trip signal will be generated by the undervoltage circuit to cause the shutting down of the drive controller and thus in turn causing the AC motor to stop. The major problem experienced is that the trip signal will be generated even when only a very short momentary sag occurs in the AC power lines. This is referred to as a "nuisance" fault trip which causes the drive controller to be turned off or shut down for a period of time. As a result, there is produced an undesired down time which reduces the efficient operation of the system.

Accordingly, it would be desirable to provide an adjustable undervoltage trip fault interrupt circuit for preventing "nuisance" undervoltage fault trips caused by instantaneous sags in the AC power lines of less than a selected time. It would be also expedient to provide the fault interrupt circuit with a variable time delay circuit in order to insure that the transient voltage drops of less than a predetermined amount of time will not produce the trip signal.

SUMMARY OF THE INVENTION

Accordingly, it is a general object of the present invention to provide a fault interrupt circuit for preventing "nuisance" undervoltage fault trips which is relatively simple and economical to manufacture and assemble, but yet overcomes the "nuisance" trips encountered heretofore.

It is an object of the present invention to provide an adjustable undervoltage trip fault interrupt circuit for preventing "nuisance" undervoltage fault trips caused by instantaneous sags in the AC power lines of less than a selectable time.

It is another object of the present invention to provide an adjustable undervoltage trip fault interrupt circuit which includes a variable time delay circuit in order to insure that transient voltage drops of less than the selected time will not produce a trip signal.

It is another object of the present invention to provide an undervoltage trip fault interrupt circuit which is formed of a time delay circuit for generating a pulse signal and a gating circuit for generating a fault trip signal only when a detected signal is longer than the selected duration of the pulse signal.

In accordance with these aims and objectives, the present invention is concerned with the provision of an undervoltage trip fault interrupter circuit used in a variable frequency drive controller for preventing activation of an undervoltage fault trip signal caused by instantaneous line sags of less than a selectable time. The interrupt circuit includes an undervoltage detection circuit which is responsive to the instantaneous line sags for generating a detected signal. A time delay circuit is responsive to the detected signal for generating a pulse signal having a selectable duration.

A gating circuit is responsive to the detected signal and the pulse signal for generating an undervoltage fault trip signal only when the detected signal is longer than the selected duration of the pulse signal. A driver circuit is responsive to the undervoltage fault trip signal for causing shutting down of an AC motor in the variable frequency controller. As a result, instantaneous line sags which are shorter than the selected duration of the pulse signal are eliminated from causing the "nuisance" interruption of the operation of the AC motor.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

It is to be distinctly understood at the outset that the present invention shown in association with a variable frequency drive (VFD) controller is not intended to serve as a limitation upon the scope or teachings thereof, but is merely for the purpose of convenience of illustration of one example of its application. The present invention has numerous applications in other fields and apparatuses since the invention pertains to an undervoltage trip fault interrupt circuit for preventing activation of a trip signal.

Figure 1:
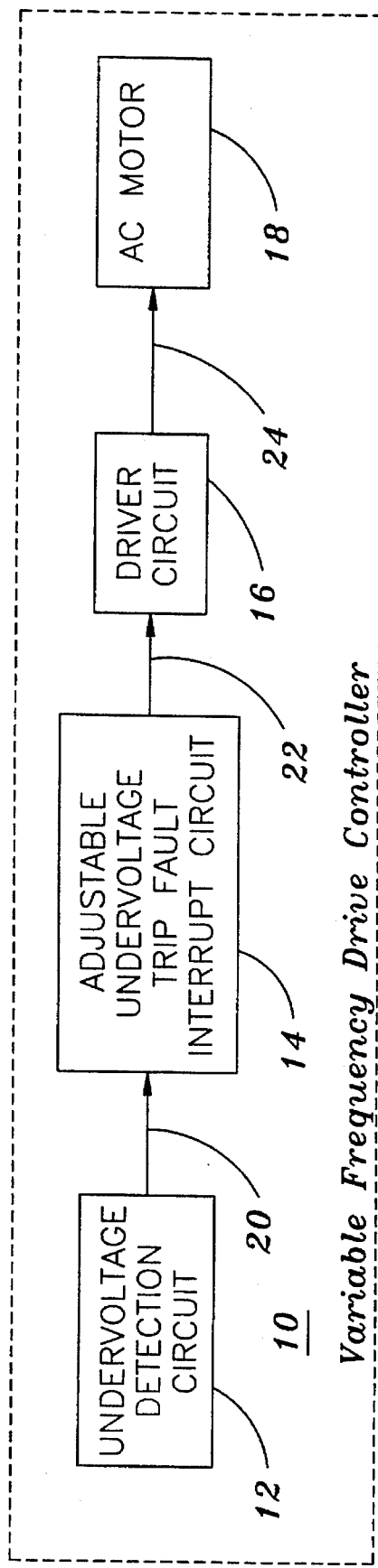
FIG. 1 is a block diagram of a variable frequency drive controller which includes an undervoltage fault trip interrupt circuit of the present invention for use with an undervoltage detection circuit and a driver circuit.

Referring now in detail to the drawings, there is shown in FIG. 1 a block diagram of a variable frequency drive (VFD) controller designated generally by reference numeral 10. The VFD controller 10 includes an undervoltage detection or sensor circuit 12, an adjustable undervoltage trip fault interrupter circuit 14 of the present invention, and a driver circuit 16 for controlling the operation of an AC motor 18. The adjustable undervoltage trip fault interrupter circuit is used to prevent "nuisance" undervoltage fault trips caused by instantaneous sags in the AC power lines of less than a selectable time.

Upon the detection of an undervoltage below a certain set point, the undervoltage detection circuit 12 will generate a detected signal on line 20. The interrupt circuit 14 is responsive to the detected signal and provides a time delay of a selected amount of time before an undervoltage fault trip signal is generated on its output line 22. The driver circuit 16 is responsive to this trip signal for shutting down or turning off the AC motor 18 via line 24. As a result, if the detected signal indicative of a momentary sag in the AC power lines has a duration which is shorter than the selected time delay, the undervoltage fault trip signal will not be provided and thus the driver circuit 16 will not cause the AC motor 18 to shut down. In this manner, the VFD controller 10 will be able to ride through the momentary line sags without interruption of its normal operation, thereby eliminating a "nuisance" undervoltage fault trip encountered heretofore.

Figure 2:
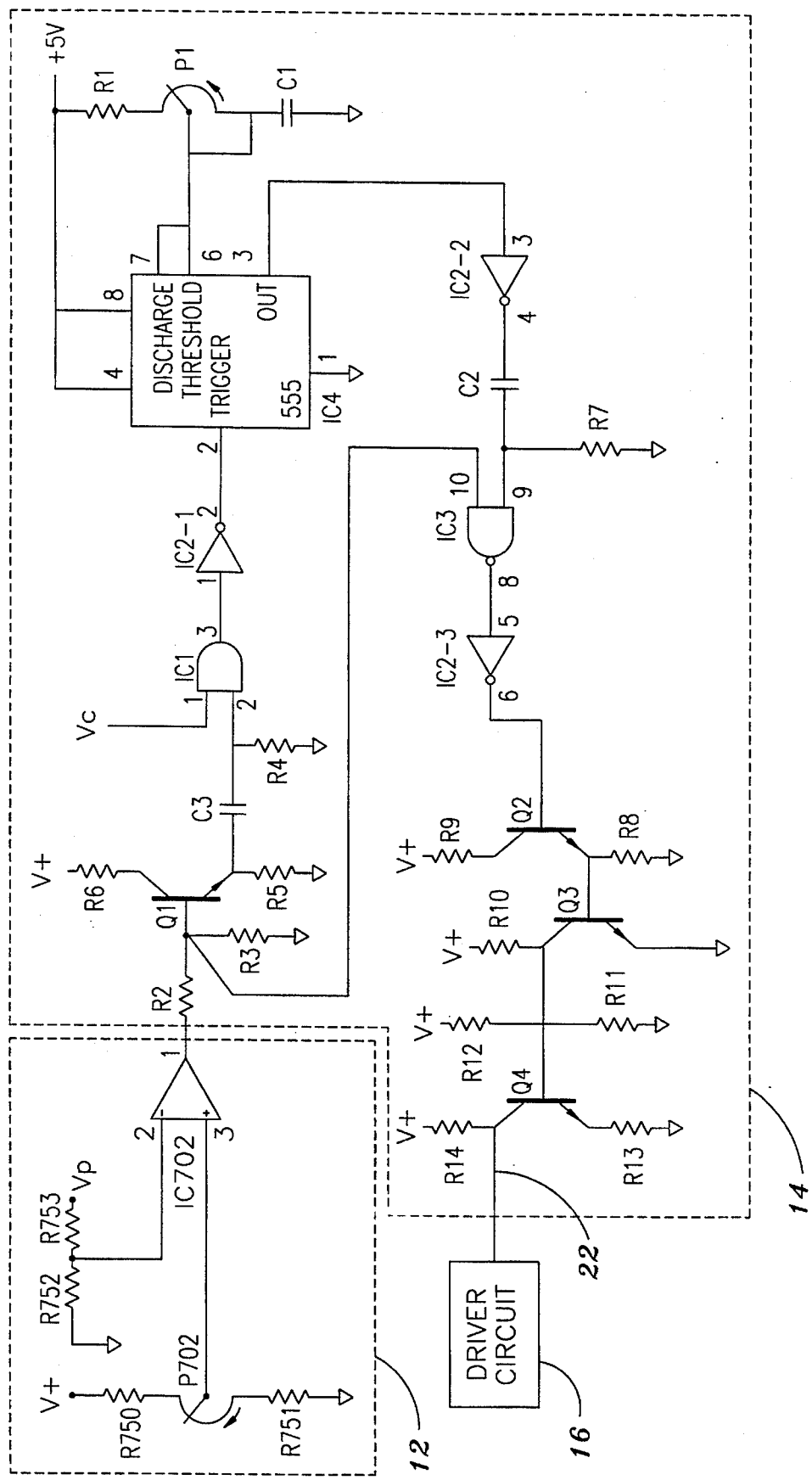
FIG. 2 is a detailed schematic circuit diagram of the interrupt circuit of FIG. 1 together with the detection circuit.

In FIG. 2, there is shown a detailed schematic circuit diagram of the adjustable undervoltage fault interrupt circuit 14 of the present invention as well as the undervoltage detection circuit 12. The detection circuit 12 is formed of an operational amplifier comparator IC702. A voltage divider is formed by series-connected resistors R752 and R753 whose junction is connected to the inverting input on pin 2 of the comparator IC702. The other end of the resistor R753 is connected to an unregulated voltage $V_p$ which is normally at +24 VDC. The other end of the resistor R752 is connected to a ground potential. An adjustable undervoltage trip set point is provided by the series connection of a resistor R750, a potentiometer P702, and a resistor R751. The other end of the resistor R750 is connected to a supply potential V+ which is typically at +15 V. The other end of the resistor R751 is connected also to the ground potential. The wiper arm of the potentiometer P702 is connected to the non-inverting input on pin 3 of the comparator IC702. The nominal undervoltage trip set point is typically selected to be approximately 5% below the incoming line voltage of 460 VAC or 437 VAC. The input voltage on pin 3 is made to be slightly lower than the input voltage on pin 2.

Accordingly, the output on pin 1 of the comparator IC702 will normally be at −15 VDC. If an instantaneous sag or drop in the line voltage occurs which exceeds the set point, the output of the comparator will be switched to +15 VDC which represents a detected signal indicative of a momentary sag in the line voltage. While the details with respect to the detection circuit 12 has just been described for generating the detected signal, it does not form any part of the present invention.

The adjustable undervoltage fault interrupt circuit 14 has its input on line 20 connected to receive the detected signal and generates at its output on line 22 an undervoltage fault trip signal only if the momentary sag in the line voltage has a duration longer than an adjustable and selectable time delay. The interrupt circuit 14 includes a voltage divider formed by series-connected resistors R2 and R3. One end of the resistor R2 defining the input of the interrupt circuit 14 is connected to receive the detected signal, and one end of the resistor R3 is connected to the ground potential. The junction of the resistors R2 and R3 is connected to the base of a transistor Q1. The transistor Q1 has its collector connected to the supply potential V+ via a collector resistor R6 and has its emitter connected to the ground potential via an emitter resistor R5. A differentiator is formed by series-connected capacitor C3 and resistor R4. One end of the capacitor C3 is connected to the emitter of the transistor Q1, and the other end of the capacitor C3 is connected to one end of the resistor R4. The other end of the resistor R4 is connected to the ground potential.

The interrupt circuit 14 further includes an AND logic gate IC1 having its first input connected to a second supply potential $V_c$ which is typically at +5 V and its second input connected to the junction of the capacitor C3 and the resistor R4. The output of the logic gate IC1 is fed to the input of an inverter IC2-1. The output of the inverter IC2-1 provides a trigger signal. The interrupt circuit 14 also includes a time delay circuit which includes a one-shot or astable multivibrator integrated circuit IC4 and its associated components. The integrated circuit IC4 has an input pin 2 for receiving the trigger signal. The values of resistor R1, potentiometer P1 and capacitor C1 are used to determine the duration of the output pulse generated on its output pin 3. The output pulse duration is variable between the range of 10 milliseconds and 5 seconds. The output of the integrated circuit IC4 is fed to the input of an inverter IC2-2 so as to invert the positive pulse to a negative pulse. The output of the inverter IC2-2 is fed to a second differentiator formed by capacitor C2 and resistor R7.

The interrupt circuit 14 further includes a logic comparison circuit formed by a NAND logic gate IC3 having a first input connected also to the junction of the resistors R2 R3 and of the voltage divider and a second input connected to the junction of the capacitor C2 and resistor R7 of the second differentiator. If a positive spike occurs at the second input (pin 9) of the logic gate IC3 falls in coincidence with the positive pulse from the voltage divider applied to the first input (pin 10), then its output on pin 8 will go to a low or logic "0" level defining the undervoltage fault trip signal. On the other hand, if the two inputs of the gate IC3 are not coincident then no trip signal will be generated by the interrupt circuit and the VFD controller 10 will be able to ride through the line sag without being interrupted.

It can be seen that the undervoltage fault trip signal at the output of the NAND gate IC3 on pin 8 is further connected to a buffer circuit formed by inverter IC2-3, transistors Q2–Q4, and resistors R8 through R14. The trip signal being at the low level is inverted by the inverter IC2-3 whose output will cause the transistor Q2 to be turned on. As a result, the transistor Q3 will also be turned on so as to cause the transistor Q4 to be non-conductive. Thus, the collector of the transistor Q4 will go to a high voltage level representing a buffered trip signal which is sent to the driver circuit 16 via the line 22 for causing the AC motor to shut down.

The operation of the adjustable undervoltage fault interrupt circuit 14 of FIG. 2 will now be described with reference to the waveforms of FIGS. 3(a) through 3(i). It will be assumed that the instantaneous sags in the incoming power lines of less than 200 mS in duration are merely momentary sags in which the VFD controller 10 should not be interrupted (i.e., the AC motor should not be caused to shut down). Therefore, the potentiometer P1 in the time delay circuit is adjusted to set the output of the integrated circuit IC4 on pin 3 to provide a 200 mS positive pulse, as illustrated in FIG. 3(e). It will be further assumed that the instantaneous line sag occurs for longer than the set time delay, such as 250 mS, as illustrated in FIG. 3(a).

Figure 3A:
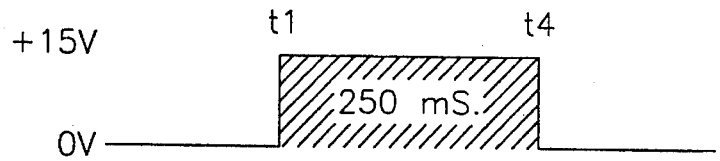
FIGS. 3(a)–3(i) are waveforms at various points in the circuit diagram of FIG. 2, useful in understanding the operation of the present invention.
Figure 3B:
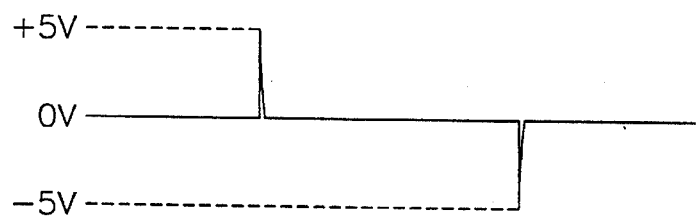
Figure 3C:
Figure 3D:
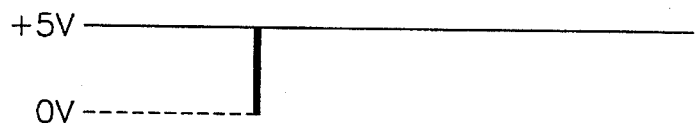
Figure 3E:
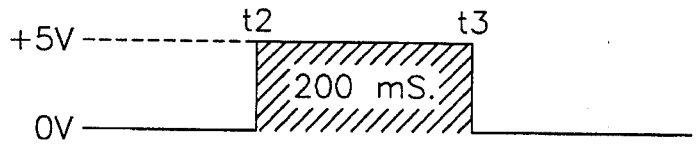

At time t1 in FIG. 3(a), it will be assumed that the undervoltage detection circuit 12 detects the instantaneous line sags and provides on the line 20 a low-to-high transition. As a result, a positive spike of FIG. 3(b) will appear on the input pin 2 of the AND gate IC1 so as to cause a short positive pulse at its output pin 3, as shown in FIG. 3(c). The positive pulse is inverted by the inverter IC2-1 to provide a negative pulse on its output, as depicted in FIG. 3(d). This negative pulse will start the multivibrator integrated circuit IC4 which generates a positive pulse on its output pin 3 beginning at time t2 and ending 200 mS later at time t3, as illustrated in FIG. 3(e).

Figure 3F:
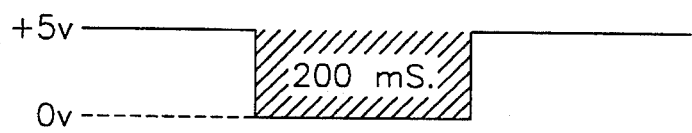
Figure 3G:
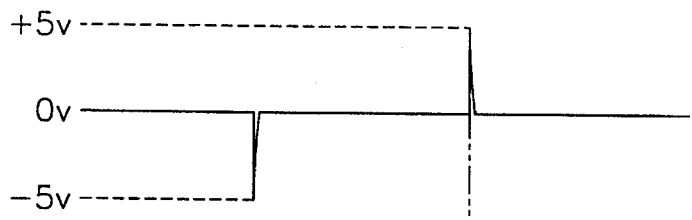
Figure 3H:

The 200 mS positive pulse is inverted by the inverter IC2-2 to produce a 200 mS negative pulse on its output pin 4. The negative pulse is shown in FIG. 3(f). The negative pulse is differentiated so as to generate a negative spike at the time t2 and a positive spike at the time t3 on the input pin 9 of the NAND gate IC3. These negative and positive spikes are shown in FIG. 3(g). The input pin 10 of the NAND gate IC3 receives the same detected signal of FIG. 3(a), except reduced in amplitude by the voltage divider (R2, R3), which is shown in FIG. 3(h).

Figure 3I:
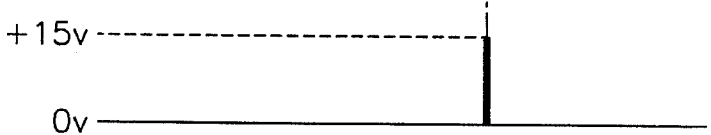

Since the instantaneous line sags is assumed to be longer than the time t3 (i.e., ending at time t4), both signals on the pins 9 and 10 of the NAND gate IC3 will be at a high logic level simultaneously so as to cause its output on pin 8 to go to a low logic level. This low logic level is the undervoltage fault trip signal which is buffered and inverted to provide a high voltage level at the collector of the transistor Q4. This buffered signal is illustrated in FIG. 3(i) and is used to control the driver circuit 16 to cause the shutting down of the AC motor 18. For completeness in the disclosure of the above-described interrupt circuit of FIG. 2 but not for purposes of limitation, the following representative values and component identifications are submitted. These values and components were employed in an interrupt circuit that was constructed and tested and which provides high quality performance. However, it should be apparent to those skilled in the art that many alternative elements and values may be employed in constructing this interrupt circuit in accordance with the present invention.

| PART | TYPE or VALUE |
| --- | --- |
| IC1 | 7408 |
| IC2-1, IC2-2, IC2-3 | 7404 |
| IC3 | 7400 |
| IC4 | 555 |
| Q1–Q4 | 2N3904 |
| P1 | 500 K ohms |
| R1, R2, R6, R9, R10, R12 | 10 K ohms |
| R3, R4, R7 | 4.7 K ohms |
| R14 | 15 K ohms |
| R8, R11 | 1.5 K ohms |
| R13 | 330 ohms |
| C1, C4 | 1.0 uF |
| C2, C3 | 0.47 uF |

From the foregoing detailed description, it can thus be seen that the present invention provides an adjustable undervoltage trip fault interrupt circuit which prevents "nuisance" undervoltage fault trips caused by instantaneous sags in the AC power lines of less than a selectable time. The interrupt circuit of the present invention includes a time delay circuit which is responsive to a detected signal for generating a pulse signal having a selectable duration. A gating circuit is responsive to the detected signal and the pulse signal for generating an undervoltage fault trip signal only when the detected signal is longer than the selected duration of the pulse signal.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An undervoltage trip fault interrupt circuit used in a variable frequency drive (VFD) controller for preventing activation of an undervoltage fault trip signal caused by instantaneous line sags of less than a selectable time, said interrupt circuit comprising in combination:

undervoltage detection circuit means (12) responsive to the instantaneous line sags for generating a detected signal;

first differentiator means formed of a series-connected first capacitor (C3) and a first resistor (R4) and being responsive to said detected signal for generating a first positive spike;

an AND logic gate (IC1) having a first input connected to receive a supply potential ($V_c$), a second input connected to receive said first positive spike, and an output;

an inverter (IC2-1) having its input connected to the output of said AND logic gate and its output generating a trigger signal;

an integrated time delay circuit (IC4) having its input connected to receive said trigger signal for generating a pulse signal on its output having a selectable duration;

said selectable duration of said pulse signal on the output of said time delay circuit being adjustable by a potentiometer (P1);

second differential means formed of a series-connected second capacitor (C2) and a second resistor (R7) and being responsive to said pulse signal for generating a second positive spike at the end of a selected duration of said pulse signal;

a NAND logic gate (IC3) having a first input connected to said second positive spike and a second input coupled to receive said detected signal for generating an undervoltage fault trip signal on its output only when said detected signal is longer than the selected duration of said pulse signal; and driver circuit means (16) having its input coupled to receive said undervoltage fault trip signal for preventing the shutting down of an AC motor in the VFD controller when the instantaneous line sags are shorter than the selected duration of said pulse signal so as to eliminate "nuisance" interruptions of the operation of the AC motor.

2. An interrupt circuit as claimed in claim 1, wherein said time duration of said pulse signal is adjusted by the potentiometer to be in the range between 10 mS and 5 seconds.

3. An interrupt circuit as claimed in claim 2, wherein said time duration is selected to be approximately 200 mS.

4. An interrupt circuit as claimed in claim 1, further comprising buffer circuit means responsive to said undervoltage fault trip signal for generating a buffered trip signal to said driver circuit means.

5. An interrupt circuit as claimed in claim 4, wherein said buffer circuit means includes an inverter and a series of transistors.

* * * * *